(12) United States Patent
Tetzlaff

(10) Patent No.: US 8,403,127 B2
(45) Date of Patent: Mar. 26, 2013

(54) BIOMASS TRANSPORT INSTALLATION FOR INTRODUCTION INTO A PRESSURISED CONTAINER

(76) Inventor: Karl-Heinz Tetzlaff, Kelkheim (DE)

( * ) Notice: Subject to any disclaimer, the term of this patent is extended or adjusted under 35 U.S.C. 154(b) by 42 days.

(21) Appl. No.: 12/919,063

(22) PCT Filed: Feb. 27, 2009

(86) PCT No.: PCT/EP2009/001390
§ 371 (c)(1),
(2), (4) Date: Nov. 16, 2010

(87) PCT Pub. No.: WO2009/112163
PCT Pub. Date: Sep. 17, 2009

(65) Prior Publication Data
US 2011/0271649 A1     Nov. 10, 2011

(30) Foreign Application Priority Data
Mar. 1, 2008   (DE) .................. 10 2008 012 154

(51) Int. Cl.
*B65G 33/26*   (2006.01)
*B65B 3/08*    (2006.01)
(52) U.S. Cl. .......... 198/666; 198/662; 53/474; 53/266.1
(58) Field of Classification Search ................. None
See application file for complete search history.

(56) References Cited

U.S. PATENT DOCUMENTS

| | | | |
|---|---|---|---|
| 3,841,465 A * | 10/1974 | Miller et al. | 241/247 |
| 4,218,222 A | 8/1980 | Nolan, Jr. et al. | |
| 4,668,130 A | 5/1987 | Sharp | |
| 4,702,177 A | 10/1987 | Narisoko et al. | |
| 4,881,862 A | 11/1989 | Dick | |
| 7,469,781 B2 * | 12/2008 | Chataing et al. | 198/668 |
| 2004/0076073 A1 | 4/2004 | Yao et al. | |
| 2006/0280663 A1 | 12/2006 | Osato et al. | |
| 2007/0199801 A1 | 8/2007 | Chataing et al. | |
| 2009/0173005 A1 | 7/2009 | Neumann | |

FOREIGN PATENT DOCUMENTS

| | | |
|---|---|---|
| CN | 1930064 A | 3/2007 |
| DE | 485696 | 11/1929 |
| DE | 4431366 A1 | 2/1996 |

(Continued)

OTHER PUBLICATIONS

"Analysis and evaluation of thermo-chemical gasification of biomass", Renewable Raw Materials, (Landwirtschaftsverlag Gmbh, Munster), 2006, pp. 54-60, 72 and 73, vol. 29.

*Primary Examiner* — Kavel Singh
(74) *Attorney, Agent, or Firm* — The Webb Law Firm

(57) ABSTRACT

The introduction of a heterogeneous solid substance, such as biomass, into a container which is under pressure is difficult. The rotary valves and airlocks used hitherto have substantial deficiencies. The use of standard screw conveyors has hitherto failed due to the fact that a cavity formed behind the screw helix in which gas could escape from the pressurized container. These deficiencies are resolved in that two independently controllable screws are arranged in a screw conveyor pipe. Between the primary screw driven by a motor and the secondary screw driven by another motor, the biomass is compacted by high pressure as a consequence of the different revolution speeds of the motors in such a way that an almost gas-tight plug is formed. The invention is particularly well-suited for the introduction of biomass into a gasification installation which is under pressure, for the production of synthesis gas.

9 Claims, 1 Drawing Sheet

FOREIGN PATENT DOCUMENTS

| | | |
|---|---|---|
| DE | 19843255 A1 | 3/2000 |
| DE | 102004019203 B3 | 12/2005 |
| DE | 102006039622 A1 | 2/2008 |
| EP | 1312662 A2 | 5/2003 |
| FR | 2867463 A1 | 9/2005 |
| JP | 2000249317 A | 9/2000 |

* cited by examiner

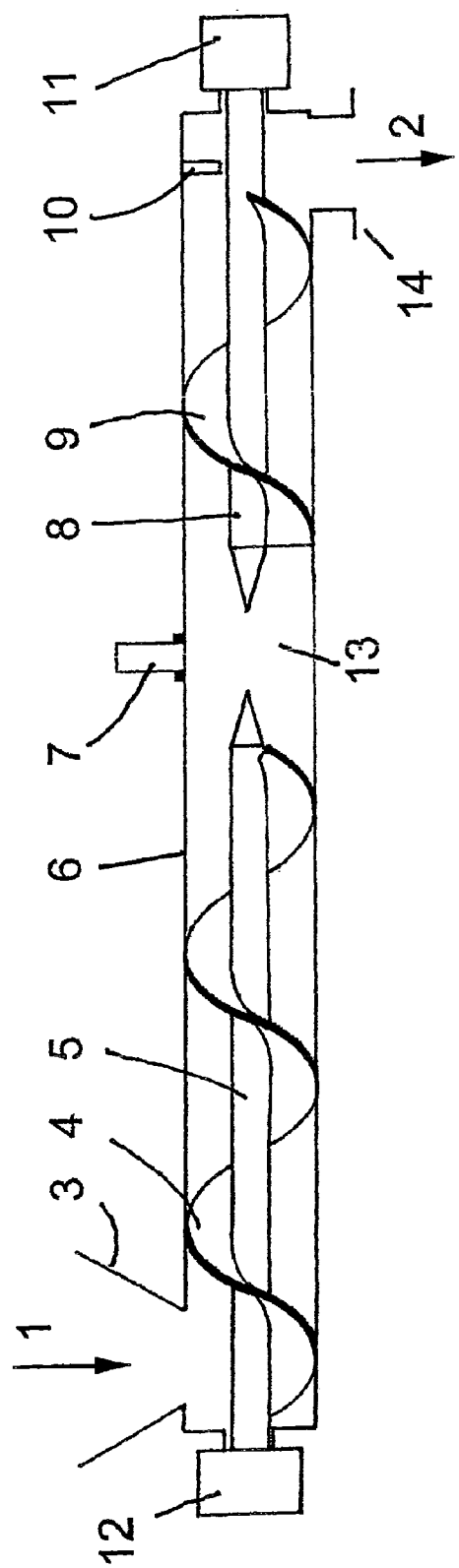

BIOMASS TRANSPORT INSTALLATION FOR INTRODUCTION INTO A PRESSURISED CONTAINER

FIELD OF THE INVENTION

The invention relates to a method and device for feeding biomass into a container which is under excess pressure. An advantageous application is the conducting of biomass into a gasifier subjected to pressure for the production of synthesis gas.

BACKGROUND AND GENERAL DESCRIPTION OF THE INVENTION

It is inherently desirable with gasification systems for the production of synthesis gas for the systems to be operated under elevated pressure from 2 to 100 bar, preferably from 12 to 40 bar. This applies in particular to industrial systems with which the synthesis gas undergoes further processing to form other products, and the synthesis gas or its subsequent products are intended to be fed into a pipe network which is under pressure, or combusted in a turbine.

Biomass gasification systems with significant excess pressures make use today either of rotary valves or airlocks, wherein the integrated conveying screws convey the biomass without any pressure gradients from the locks into the gasification installation. The prior art is documented in "Analysis and evaluation of thermo-chemical gasification of biomass", from the series "Renewable raw materials", Volume 29, Landwirtschaftsverlag GmbH, Münster (2006). Of relevance here are the pages 54-59 and Table 2-7 on pages 72-73.

Standard screw conveyors, with which the screw extends over the entire section between inlet and outlet, are, as a rule, only partially filled. The gas from a pressurised container can therefore flow back against the conveying direction. Even when this screw conveyor is filled completely, the compaction of the conveyed material forms a cavity behind the screw helix in which gas can flow back.

At the Karlsruhe Research Centre a method has been developed under the name "Bioliq", which converts biomass into a fluid capable of being pumped. The method has been disclosed under DE 10 2004 019 203 B3. The method does enable the conveying of the fluid produced in this way against a high pressure, but this is offset by high expenditure and effort for the production of this fluid.

Nor is it possible, in the associated field of the introduction of brown coal into a fluidised bed operated under slight excess pressure, for the generation of heat for a steam power station, to derive any transfer for the conveying of biomass into a container under pressure of more than 2 bar. Examples of this are the pipe chain conveyor which is disclosed in DE 198 43 255 A1, or the piston conveyor disclosed in DE 44 31 366 A1.

It is the object of the invention to introduce very different types of biomass into a container under excess pressure with a simple conveying installation.

Biomass is a highly complex raw material. For example, for thermo-chemical gasification to synthesis gas, consideration is to be given to:
  Wood with differing water content and of considerably different consistency, such as saw residues and wood chippings,
  Energy plants as fresh mass, ensiled, pressed, dried, in coarse or fine particles,
  Oil in mixtures with solid biomass
  Grains and fibres
  Foodstuffs of all kinds and waste from the foodstuffs industry
  Effluents from animal husbandry The biomass should be conveyed as a homogenous substance or as the broadest possible substance mixture with a screw conveyor against an excess pressure.

A self-sealing feeding of biomass into a pressurized chamber is achieved. The device makes provision for two screw conveyors with revolution speeds which can be separately controlled to be arranged in series behind one another. This allows the biomass to be compacted in the space between the two screw conveyors in such a way that an almost gas-tight plug of biomass is formed. As a departure from systems with one conveying screw, with the two screw system according to the invention the pressure in the plug is controlled by the revolution speed of the downstream screw. The device according to the invention allows for large cross-sections and thereby reduces blockage or leaks when introducing biomass in large pieces. As a result, the infeed of biomass with very different properties is possible.

The two screw conveyors to be arranged axially behind one another in a pipe. This makes it possible to do away with deflection of the conveying flow, which is problematic for many types of biomass.

The formation of a sealing plug is rendered easier in that a section is provided between the two conveying screws which does not contain any conveying elements. This allows for a longer sealing stretch to be formed, which is advantageous in particular for largely dry biomass.

The primary screw conveyor can also be designed as a screw press. This is advantageous if the biomass contains more than 50% water.

One of the screw conveyors can also be designed as a twin screw conveyor. This allows for higher pressures to be attained, and homogenization and comminution of the biomass introduced.

Heating over the screw pipe and the worm shaft is advantageous, since this allows the biomass to be plastically deformed more easily, and it therefore provides a better seal.

At the end of the conveying stretch a dividing device is advantageous, which facilitates the discharge of the biomass into an area under excess pressure.

DESCRIPTION OF AN EXAMPLE

The invention is described in greater detail by the example in FIG. 1.

The biomass 1 is discharged at the hopper 3, for example by means of a receiver with a rotary valve, and leaves the conveying installation at the outlet 2 via the flange 14, which is connected to a container under excess pressure or a further conveying installation. The biomass 1 initially runs through the primary screw conveyor, formed from the screw pipe 6, the worm shaft 5, and the screw helix 4. The biomass 1 is then pushed through a pipe section 13, which does not contain any conveying elements. The plug of biomass formed in the pipe section 13 then passes into the secondary screw conveyor, formed from the screw pipe 6, the worm shaft 8, and the screw helix 9. At the end of the conveying stretch the biomass falls at the outlet 2 into a chamber under excess pressure. It has proved to be advantageous if a passive or active dividing device 10 is arranged at the end of the conveying stretch.

The revolution speed of the primary screw conveyor, driven by motor 12, largely determines the conveying capacity. The revolution speed of the secondary screw conveyor, which is driven by the motor 11, largely determines the sealing tightness of the conveying installation. The pressure in the pipe section 13, which is measured by pressure sensor 7, controls the revolution speed of the secondary screw conveyor, driven by the motor 11. This pressure corresponds to the sealing tightness of the conveying installation. The best value for the pressure can be determined as a function of the type of the biomass from a gas analysis of the gas flowing back in traces at the charging hopper 3. As a rule, the pressure in the pipe section 13 will be higher than the system pressure at the flange 14.

With the invention it is possible for the most widely differing biomasses to be introduced into a system which is under a higher pressure. This is of considerable economic significance for the industrial thermo-chemical gasification of the biomass to synthesis gas.

To summarise once again, therefore, a biomass conveying installation is proposed for feeding into a pressurised container. The introduction of a heterogeneous solid substance, such as biomass, into a container which is under pressure is difficult. The rotary valves and airlocks used hitherto have substantial deficiencies. The use of standard screw conveyors has hitherto failed due to the fact that a cavity formed behind the screw helix in which gas could escape from the pressurised container. These deficiencies are resolved in that two independently controllable screws are arranged in a screw conveyor pipe 6. Between the primary screw driven by motor 12 and the secondary screw driven by motor 11, the biomass is compacted by high pressure as a consequence of the different revolution speeds of the motors 11, 12 in such a way that an almost gas-tight plug 13 is formed. The invention is particularly well-suited for the introduction of biomass into a gasification installation which is under pressure, for the production of synthesis gas.

The invention claimed is:

1. A method for feeding biomass into a pressurized container with the aid of a screw conveyor system, comprising: providing a screw conveyor system wherein the screw conveyor system consists of at least two screw conveyors, wherein the screw conveyors are arranged axially behind one another, and wherein a section without conveying elements is arranged between the two screw conveyors, in which the revolution speed of the screw conveyors is controlled independently of one another in such a way that an almost gas-tight plug of biomass is formed.

2. The method according to claim 1, in which a mixture of coarse-particle and fine-particle biomass is fed to the inlet of the screw conveyor system.

3. The method according to claim 1, in which the biomass is mashed with a fluid.

4. The method according to claim 1, in which the biomass is pre-heated.

5. A device for feeding biomass into a pressurized container with the aid of a screw conveyor system, wherein the screw conveyor system consists of at least two screw conveyors, wherein the screw conveyors are arranged on a common axis behind one another, wherein a section without conveying elements is arranged between the two screw conveyors, and wherein the revolution speed of the two screw conveyors can be controlled independently of one another, wherein a dividing device for biomass is arranged at the end of the screw conveyor system.

6. The device according to claim 5, wherein at least one screw conveyor is heatable.

7. The method according to claim 2, in which the biomass is mashed with a fluid.

8. The method according to claim 2, in which the biomass is pre-heated.

9. The method according to claim 3, in which the biomass is pre-heated.

* * * * *

UNITED STATES PATENT AND TRADEMARK OFFICE
CERTIFICATE OF CORRECTION

PATENT NO.       : 8,403,127 B2
APPLICATION NO. : 12/919063
DATED            : March 26, 2013
INVENTOR(S)      : Karl-Heinz Tetzlaff It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 118 days.

Signed and Sealed this
First Day of September, 2015

Michelle K. Lee
*Director of the United States Patent and Trademark Office*